US008399551B2

(12) United States Patent
Gong et al.

(10) Patent No.: US 8,399,551 B2
(45) Date of Patent: Mar. 19, 2013

(54) FUNCTIONALIZED ELASTOMER NANOCOMPOSITE

(75) Inventors: Caiguo Gong, Pearland, TX (US); Anthony Jay Dias, Houston, TX (US); Andy Haishung Tsou, Houston, TX (US); Beverly Jean Poole, Houston, TX (US); Kriss Randall Karp, Cleveland, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 1094 days.

(21) Appl. No.: 10/518,193

(22) PCT Filed: May 30, 2003

(86) PCT No.: PCT/US03/17204
§ 371 (c)(1),
(2), (4) Date: Aug. 22, 2005

(87) PCT Pub. No.: WO2004/005388
PCT Pub. Date: Jan. 15, 2004

(65) Prior Publication Data
US 2006/0100339 A1  May 11, 2006

Related U.S. Application Data

(60) Provisional application No. 60/394,152, filed on Jul. 5, 2002.

(51) Int. Cl.
*C08K 3/34* (2006.01)
*C08F 222/08* (2006.01)
*C08F 210/00* (2006.01)

(52) U.S. Cl. ........ 524/445; 524/447; 524/492; 524/495; 524/496; 526/258; 526/318.2; 526/326; 526/307.8

(58) Field of Classification Search .................. 524/445, 524/447, 492, 495, 496; 526/258, 318.2, 526/326, 307.8
See application file for complete search history.

(56) References Cited

U.S. PATENT DOCUMENTS

| 3,288,714 A | 11/1966 | Osuch .............................. 252/57 |
| 4,074,035 A | 2/1978 | Powers et al. |
| 4,228,254 A | 10/1980 | Powers et al. ................. 525/256 |
| 4,395,506 A | 7/1983 | Nagano et al. |
| 4,472,538 A | 9/1984 | Kamigaito et al. |
| 4,632,963 A | 12/1986 | Gardner et al. |
| 4,703,091 A | 10/1987 | Gardner et al. |
| 4,810,734 A | 3/1989 | Kawasumi et al. |
| 4,889,885 A | 12/1989 | Usuki et al. |
| 5,162,445 A | 11/1992 | Powers et al. |
| 5,300,569 A * | 4/1994 | Drake et al. ..................... 525/78 |
| 5,356,950 A | 10/1994 | White et al. .................. 522/116 |
| 5,480,810 A | 1/1996 | Wei et al. ........................... 437/2 |
| 5,498,673 A | 3/1996 | Patil ........................... 525/333.3 |
| 5,514,734 A | 5/1996 | Maxfield et al. |
| 5,576,372 A | 11/1996 | Kresge et al. .................. 524/442 |
| 5,576,373 A | 11/1996 | Kresge et al. .................. 524/445 |
| 5,621,044 A * | 4/1997 | Wang ............................. 525/193 |
| 5,665,183 A | 9/1997 | Kresge et al. .................. 152/204 |
| 5,700,871 A | 12/1997 | Arjunan et al. ................... 525/74 |
| 5,807,629 A * | 9/1998 | Elspass et al. ................ 428/323 |
| 5,814,707 A | 9/1998 | Fréchet et al. ............. 525/333.3 |
| 5,840,810 A | 11/1998 | Fréchet et al. ............. 525/333.3 |
| 5,849,828 A | 12/1998 | Fréchet et al. .................. 525/342 |
| 5,883,173 A | 3/1999 | Elspass et al. ................. 524/446 |
| 5,936,023 A | 8/1999 | Kato et al. ..................... 524/445 |
| 5,973,053 A | 10/1999 | Usuki et al. .................... 524/445 |
| 6,015,862 A * | 1/2000 | Chung et al. ................... 525/320 |
| 6,034,164 A | 3/2000 | Elspass et al. ................. 524/445 |
| 6,060,549 A | 5/2000 | Li et al. .......................... 524/445 |
| 6,103,817 A | 8/2000 | Usuki et al. .................... 524/574 |
| 6,117,932 A | 9/2000 | Hasegawa et al. |
| 6,372,855 B1 * | 4/2002 | Chino et al. ................ 525/327.4 |
| 6,656,995 B2 | 12/2003 | Klendworth et al. |
| 6,759,464 B2 * | 7/2004 | Ajbani et al. .................. 524/445 |
| 6,849,680 B2 | 2/2005 | Knudson, Jr. et al. |
| 7,078,449 B2 | 7/2006 | Pagano et al. |
| 2001/0033924 A1 | 10/2001 | Qian et al. .................. 428/297.1 |
| 2003/0144401 A1 | 7/2003 | Ajbani et al. |
| 2004/0014839 A1 | 1/2004 | Bomal et al. |
| 2004/0102557 A1 * | 5/2004 | Nanni et al. ................... 524/406 |
| 2005/0197438 A1 | 9/2005 | Bomal et al. |
| 2006/0100339 A1 | 5/2006 | Gong et al. |

(Continued)

FOREIGN PATENT DOCUMENTS

| DE | 198 42 845 | 4/1999 |
| EP | 0 472 344 | 2/1992 |

(Continued)

OTHER PUBLICATIONS

Abstract for DE 198 42 845, Hasegawa et al., published Apr. 1, 1999, 3 pages, Entitled "Resin Composite".

(Continued)

*Primary Examiner* — Satya Sastri
(74) *Attorney, Agent, or Firm* — Nancy T. Krawczyk; Leandro Arechederra, III; Kevin M. Faulkner

(57) ABSTRACT

An embodiment of the present invention is a nanocomposite comprising a clay and an elastomer comprising at least $C_2$ to $C_{10}$ olefin derived units; wherein the elastomer also comprises functionalized monomer units pendant to the elastomer. Desirable embodiments of the elastomer include poly (isobutylene-co-p-alkylstyrene) elastomers and poly (isobutylene-co-isoprene) elastomers, which are functionalized by reacting free radical generating agents and unsaturated carboxylic acids, unsaturated esters, unsaturated imides, and the like, with the elastomer. The clay is exfoliated in one embodiment by the addition of exfoliating agents such as alkyl amines and silanes to the clay. The composition can include secondary rubbers such as general purpose rubbers, and curatives, fillers, and the like. The nanocomposites of the invention have improved air barrier properties such as are useful for tire innerliners and innertubes.

10 Claims, No Drawings

FOREIGN PATENT DOCUMENTS

| | | |
|---|---|---|
| EP | 0 787 157 | 8/1997 |
| EP | 1 029 823 * | 8/2000 |
| FR | 2 189 424 | 1/1974 |
| JP | 11-323023 | 11/1999 |
| JP | 2000-159937 | 6/2000 |
| WO | WO 92/02582 | 2/1992 |
| WO | WO 99/07790 | 2/1999 |
| WO | WO 00/34376 | 6/2000 |
| WO | WO 00/34393 | 6/2000 |
| WO | WO 00/69966 | 11/2000 |
| WO | WO 01/96467 | 12/2001 |
| WO | WO02/02582 | 1/2002 |
| WO | WO 02/24759 | 3/2002 |
| WO | WO 02/48257 | 6/2002 |

OTHER PUBLICATIONS

Abstract for JP 11323023, published Nov. 26, 1999, Application No. 98 JP 130725, filed May 13, 1998, entitled "Rubber Composition Used for Pneumatic Tires".

Abstract for FR 2 189 424, Minatono et al., published Jan. 25, 1974, 1 page, Entitled "Maleic Anhydride-Modified Polyisoprene Rubber".

Liu et al., Polymer Bulletin 43, pp. 51-58 (1999), entitled "Preparation of Hydrophobic Poly(Isobutylene) Star Polymers with Hydrophilic Poly(Propylene Imine) Dendritic Cores".

* cited by examiner

FUNCTIONALIZED ELASTOMER NANOCOMPOSITE

CROSS REFERENCE TO RELATED APPLICATIONS

This application is a National Stage Application of International Application No. of PCT/US2003/017204, filed May 30, 2003 and claims the benefit of Provisional Application No. 60/394,152, filed, Jul. 5, 2002, the disclosure of which is incorporated by reference in its entirety.

FIELD OF THE INVENTION

The present invention relates to nanocomposites comprising clays and elastomers. More particularly, the present invention relates to nanocomposites suitable for air barriers that are a blend of a clay and a functionalized phenyl-containing, or styrenic-based, elastomer, wherein the functionalization is carried out via free radical initiated reactions with unsaturated compounds.

BACKGROUND OF THE INVENTION

Nanocomposites are polymer systems containing inorganic particles with at least one dimension in the nanometer range. Elastomers comprising phenyl groups including, for example, styrenic-based elastomers comprising at least one styrene or substituted styrene unit therein, are one type of elastomer that can be incorporated into a nanocomposite. Some examples of these are disclosed in U.S. Pat. Nos. 6,060,549, 6,103,817, 6,034,164, 5,973,053, 5,936,023, 5,883,173, 5,807,629, 5,665,183, 5,576,373, and 5,576,372. A common type of inorganic particle used in nanocomposites are phyllosilicates, an inorganic substance from the general class of so called "nano-clays" or "clays". Ideally, intercalation should take place in the nanocomposite, wherein the polymer inserts into the space or gallery between the clay surfaces. Ultimately, it is desirable to have exfoliation, wherein the polymer is fully dispersed with the individual nanometer-size clay platelets. Due to the general enhancement in air barrier qualities of various polymer blends when clays are present, there is a desire to have a nanocomposite with low air permeability; especially a dynamically vulcanized elastomer nanocomposite such as used in the manufacture of tires.

One method to improve nanocomposite performance is to use functionalized polymers blended with clay. This approach has been limited to materials that are soluble in water or to materials that can be incorporated into the polymerization reaction. This approach has been used to prepare nylon nanocomposites, using for example, oligomeric and monomeric caprolactam as the modifier. Polyolefin nanocomposites, such as polypropylene nanocomposites, have utilized maleic anhydride grafted polypropylenes to achieve some success in the formation of nanocomposites.

To form articles such as air barriers, it is desirable to use elastomers such as isobutylene-based elastomers, for example, poly(isobutylene-co-p-alkylstyrene) elastomers and poly(isobutylene-co-isoprene) elastomers. While these elastomers have been functionalized in order to improve compatibility or cross-linkability with other polymers, suitability of such functionalized polymers for nanocomposites has not been demonstrated or disclosed. See, for example, U.S. Pat. Nos. 6,372,855 B1; 6,015,862; 5,849,828; 5,480,810; 5,814,707; 5,700,871; 5,498,673; 5,356,950; JP 11323023 (98 JP-130725 A); EP 0 787 157 B1; and Liu et al., 43 POLYMER BULLETIN 51-58 (1999). What would be desirable is to provide an improved air barrier using such nanomposites that include these styrenic-based elastomers, thus improving upon the air barrier qualities that exist for these elastomers.

Other background references include WO 02/24759, WO 00/34393, WO 01/96467, WO 00/34376, WO 99/07790, FR 2 189 424 A, U.S. Pat. No. 3,288,714, and EP 0 472 344 A.

SUMMARY OF THE INVENTION

The present invention provides a nanocomposite suitable for an air barrier comprising a clay, desirably a swellable clay, and an elastomer comprising $C_2$ to $C_{10}$ olefin derived units; wherein the elastomer comprises functionalized monomer units pendant to the elastomer. Desirable embodiments of the elastomer include poly(isobutylene-co-p-alkylstyrene) elastomers and poly(isobutylene-co-isoprene) elastomers, which are functionalized by reacting free radical generating agents and unsaturated carboxylic acids, unsaturated esters, unsaturated imides, and the like, with the elastomer. The clay is exfoliated in one embodiment by the addition of exfoliating agents such as alkyl amines and silanes to the clay. The composition can include secondary rubbers such as general purpose rubbers, and curatives, fillers, and the like. The nanocomposites of the invention have improved air barrier properties such as are useful for tire innerliners and innertubes.

DETAILED DESCRIPTION OF THE INVENTION

The present invention provides a nanocomposite material suitable for air barriers such as innerliners and innertubes for transportation vehicles, trucks, automobiles, and the like. One aspect of the nanocomposite includes a clay, preferably a swellable clay, and more preferably an exfoliated clay, and an elastomer, the elastomer comprising $C_2$ to $C_{10}$ olefin derived units; wherein the elastomer also comprises functionalized monomer units having functionalized groups pendant to the elastomer E that can be described by the following structures (I) and (II):

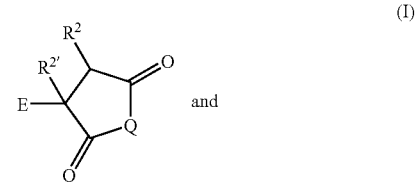

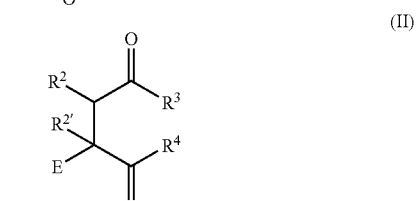

wherein Q is selected from O and an $NR^1$ group, wherein $R^1$ is selected from hydrogen, $C_1$ to $C_{20}$ alkyls, alkenyls or aryls, substituted $C_1$ to $C_{20}$ alkyls, alkenyls or aryls; $R^2$ and $R^{2'}$ are the same or different and are selected from hydrogen, $C_1$ to $C_{20}$ alkyls, alkenyls or aryls, substituted $C_1$ to $C_{20}$ alkyls, alkenyls or aryls, hydroxyl and $C_1$ to $C_{20}$ alkoxys; and wherein $R^3$ and $R^4$ are the same or different and selected from —$OR^5$ and —$NHR^5$, wherein $R^5$ is defined as $R^1$ above.

In another aspect of the invention, the nanocomposite can be described as comprising a clay and the product of contacting an elastomer comprising $C_2$ to $C_{10}$ olefin derived units with at least one peroxide and at least one functionalizing compound selected from unsaturated carboxylic acids, unsaturated esters and unsaturated imides and mixtures thereof. In any case, the clay may be exfoliated with an exfoliating additive such as an amine or silane compound, as described herein.

The elastomer may be any suitable elastomer as described herein, desirably isobutylene elastomers such as poly(isobutylene-co-p-alkylstyrene) elastomers and poly(isobutylene-co-isoprene) elastomers. These are described further below. The nanocomposite may also include other secondary rubbers, fillers, and curatives, and may be cured by such means as, for example, heating, to form an article of manufacture that is suitable for air barriers, etc.

The various aspects of the nanocomposite and its use as an air barrier are described more particularly herein, wherein the various embodiments described for each component are attributable to the various aspects and embodiments of the invention.

As used herein, in reference to Periodic Table "Groups", the new numbering scheme for the Periodic Table Groups are used as in HAWLEY'S CONDENSED CHEMICAL DICTIONARY 852 (13th ed. 1997).

The term "elastomer", as used herein, refers to any polymer or composition of polymers consistent with the ASTM D1566 definition. The term "elastomer" may be used interchangeably with the term "rubber", as used herein.

As used herein, the term "alkyl" refers to a paraffinic hydrocarbon group which may be derived from an alkane by dropping one or more hydrogens from the formula, such as, for example, a methyl group, or $CH_3^-$, or an ethyl group, $CH_3CH_2^-$, etc.

As used herein, the term "alkenyl" refers to a unsaturated paraffinic hydrocarbon group which may be derived from an alkane by dropping one or more hydrogens from the formula, such as, for example, an ethenyl group, $CH_2=CH^-$, and a propenyl group, or $CH_3CH=CH^-$, etc.

As used herein, the term "aryl" refers to a hydrocarbon group that forms a ring structure characteristic of aromatic compounds such as, for example, benzene, naphthalene, phenanthrene, anthracene, etc., and typically possess alternate double bonding ("unsaturation") within its structure. An aryl group is thus a group derived from an aromatic compound by dropping one or more hydrogens from the formula such as, for example, phenyl, or $C_6H_5^-$.

By "substituted", it is meant substitution of at least one hydrogen group by at least one substituent selected from, for example, halogen (chlorine, bromine, fluorine, or iodine), amino, nitro, sulfoxy (sulfonate or alkyl sulfonate), thiol, alkylthiol, and hydroxy; alkyl, straight or branched chain having 1 to 20 carbon atoms which includes methyl, ethyl, propyl, tert-butyl, isopropyl, isobutyl, etc.; alkoxy, straight or branched chain alkoxy having 1 to 20 carbon atoms, and includes, for example, methoxy, ethoxy, propoxy, isopropoxy, butoxy, isobutoxy, secondary butoxy, tertiary butoxy, pentyloxy, isopentyloxy, hexyloxy, heptryloxy, octyloxy, nonyloxy, and decyloxy; haloalkyl, which means straight or branched chain alkyl having 1 to 20 carbon atoms which is substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromomethyl, 2,2-difluoroethyl, 3,3-dichloropropyl, 3,3-difluoropropyl, 4,4-dichlorobutyl, 4,4-difluorobutyl, trichloromethyl, 4,4-difluorobutyl, trichloromethyl, trifluoromethyl, 2,2,2-trifluoroethyl, 2,3,3-trifluoropropyl, 1,1,2,2-tetrafluoroethyl, and 2,2,3,3-tetrafluoropropyl. Thus, for example, an example of a "substituted styrenic unit" would include p-methylstyrene, p-ethylstyrene, etc.

Elastomer

Elastomers suitable for use in the present invention comprise $C_2$ to $C_{10}$ olefin derived units. As used herein, the term "olefin" includes "isoolefins" such as, for example, isobutylene, as well as "multiolefins" such as, for example, isoprene. Preferably, the elastomer also comprises monomer units having phenyl groups pendant to the elastomer backbone, the phenyl groups either substituted or not. More preferably, the elastomer also comprises styrenic derived units selected from styrenes and substituted styrenes, non-limiting examples of which include α-methylstyrene, o- (ortho), m- (meta), and p (para)-methylstyrene, o-, m-, and p-tert-butylstyrene, etc.

In one embodiment of the invention, the elastomer is a random copolymer of units selected from $C_2$ to $C_{10}$ olefin derived units (hereinafter, ethylene or "$C_2$" is referred to as an olefin derived unit) and styrenic derived unit such as, for example p-alkylstyrene derived units; wherein the p-alkylstyrene derived units are preferably p-methylstyrene containing at least 80%, more preferably at least 90% by weight of the p-isomer. In another embodiment of the invention, the elastomer is a random copolymer of a $C_4$ to $C_7$ isoolefin, such as isobutylene, and a styrenic monomer, such as a p-alkylstyrene comonomer, preferably p-methylstyrene containing at least 80%, more preferably at least 90% by weight of the p-isomer. In yet another embodiment, the elastomer is a copolymer of a isoolefin such as isobutylene and a multiolefin such as isoprene, or "butyl" rubber.

In one embodiment of the invention, the elastomer may be a copolymer of styrenic derived units and/or substituted styrenic derived units, and olefin derived units as described above. The styrene derived units are present from 3 wt % to 20 wt % based on the total weight of the polymer in one embodiment, from 5 wt % to 12 wt % in another embodiment, from 5 wt % to 15 wt % in yet another embodiment, and from 8 wt % to 13 wt % in yet another embodiment, and from 1 wt % to 15 wt %, wherein a desirable range of styrene derived unit may include any upper wt % limit with any lower wt % limit described herein. The olefin is present in the elastomer in a range of from 70 wt % to 99.5 wt % by weight of the elastomer in one embodiment, and 85 wt % to 99.5 wt % in another embodiment. Suitable olefins are selected from $C_2$ to $C_{10}$ olefins, non-limiting examples of which include ethylene, propene, 1-butene, isobutylene (an isoolefin), 1-hexene, 1-octene, cyclopentadiene (a multiolefin) and isoprene (a multiolefin). For example, one embodiment of a suitable elastomer for nanocomposites of the invention may be a copolymer or terpolymer of any one or two of these monomers with a styrenic monomer such as, for example, α-methylstyrene, o-methylstyrene, m-methylstyrene, and p-methylstyrene monomers.

Non-limiting examples of elastomers that are suitable for the nanocomposite of the invention include any one or a mixture of natural rubber, poly(isobutylene-co-isoprene), polybutadiene, poly(styrene-co-butadiene), poly(isoprene-co-butadiene), poly(styrene-isoprene-butadiene), poly(isoprene-isobutylene-alkylstyrene), star-branched polyisobutylene rubber, poly(isobutylene-co-p-methylstyrene), ethylene-propylene-alkylstyrene rubber, ethylene-propylene-styrene rubber, wherein reference to an "alkyl" includes any $C_1$ to $C_{10}$ straight or branched chain alkyl. In one embodiment, elastomers incorporating alkylstyrene derived units are particularly desirable.

In one embodiment of the invention, the elastomer suitable for the nanocomposite is a non-halogenated elastomer, meaning that the elastomer has not been subjected to a halogenation process, or otherwise comprise halogen moieties.

An example of a suitable elastomer for use in the present invention is poly(isobutylene-co-p-methylstyrene), or "XP50" (ExxonMobil Chemical Company, Houston Tex.). These isoolefin copolymers, their method of preparation and cure are more particularly disclosed in U.S. Pat. No. 5,162,445. These elastomers have a substantially homogeneous compositional distribution such that at least 95% by weight of the polymer has a p-alkylstyrene content within 10% of the average p-alkylstyrene content of the polymer. Desirable copolymers are also characterized by a molecular weight distribution (Mw/Mn) of between 2 and 20 in one embodiment, and less than 10 in another embodiment, and less than 5 in another embodiment, and less than 2.5 in yet another embodiment, and greater than 2 in yet another embodiment; a preferred viscosity average molecular weight in the range of from 200,000 up to 2,000,000 and a preferred number average molecular weight in the range of from 25,000 to 750,000 as determined by gel permeation chromatography.

The "elastomer", as described herein, may also comprise a composition of one or more of the same elastomer having differing molecular weights to yield a composition having a bimodal molecular weight distribution. This bimodal distribution can be achieved by, for example, having a low molecular weight component in the elastomer. This can be accomplished by physically blending two different MW polymers together, or by in situ reactor blending. In one embodiment, the elastomer has a low molecular weight (weight average molecular weight) component of from 5,000 MW to 80,000 MW in one embodiment, and from 10,000 MW to 60,000 MW in another embodiment; the low molecular weight component comprising from 5 to 40 wt % of the composition in one embodiment, and from 10 to 30 wt % of the composition in another embodiment.

In an embodiment comprising poly(isobutylene-co-p-methylstyrene) as the elastomer, the p-methylstyrene derived units are present from 3 wt % to 15 wt % based on the total weight of the polymer, and from 5 wt % to 12 wt % in another embodiment, and from 8 wt % to 13 wt % in yet another embodiment, wherein a desirable range of p-methylstyrene may include any upper wt % limit with any lower wt % limit described herein. The isobutylene derived units are present in the elastomer in a range from 70 to 99.5 wt % by weight of the elastomer in one embodiment, and 85 to 99.5 wt % in another embodiment.

In another embodiment, the elastomer suitable for use in the nanocomposite of the invention is a copolymer of an isomonoolefin (or isoolefin) and a multiolefin, or a "butyl" rubber. In one embodiment of the invention, the elastomer is a copolymer of a $C_4$ to $C_6$ isoolefin and a multiolefin. In another embodiment, the elastomer is a blend of a polydiene or block copolymer, and a copolymer of a $C_4$ to $C_6$ isoolefin and a conjugated, or a "star-branched" butyl polymer. The butyl elastomer useful in the present invention can thus be described as comprising $C_4$ to $C_7$ isoolefin derived units and multiolefin derived units, and includes both "butyl rubber" and so called "star-branched" butyl rubber.

As used herein, "butyl rubber" refers to both butyl rubber and so-called "star-branched" butyl rubber, described below. Preferably, the olefin polymerization feeds employed in producing the butyl rubber of the invention are those olefinic compounds conventionally used in the preparation of butyl-type rubber polymers. Butyl polymers may be prepared by reacting a comonomer mixture, the mixture having at least (1) a $C_4$ to $C_6$ isoolefin monomer component such as isobutylene with (2) a multiolefin, or conjugated diene, monomer component. The isoolefin is in a range from 70 wt % to 99.5 wt % by weight of the total comonomer mixture in one embodiment, and 85 wt % to 99.5 wt % in another embodiment. The multiolefin component in one embodiment is present in the comonomer mixture from 30 to 0.5 wt % in one embodiment, and from 15 wt % to 0.5 wt % in another embodiment. In yet another embodiment, from 8 wt % to 0.5 wt % of the comonomer mixture is multiolefin.

Suitable isoolefins include $C_4$ to $C_7$ compounds such as isobutylene, isobutene, 2-methyl-1-butene, 3-methyl-1-butene, 2-methyl-2-butene, and 4-methyl-1-pentene. The multiolefin is a $C_4$ to $C_{14}$ conjugated diene such as isoprene, butadiene, 2,3-dimethyl-1,3-butadiene, myrcene, 6,6-dimethyl-fulvene, cyclopentadiene, hexadiene and piperylene. One embodiment of a butyl rubber suitable for use in the invention comprises from 92 wt % to 99.5 wt % of isobutylene and from 0.5 wt % to 8 wt % isoprene, and from 95 wt % to 99.5 wt % isobutylene and 0.5 wt % to 5.0 wt % isoprene in yet another embodiment.

The star-branched butyl rubber is a composition of a butyl rubber, either halogenated or not, and a polydiene or block copolymer, either halogenated or not. The polydienes/block copolymer, or branching agents (hereinafter "polydienes"), are typically cationically reactive and are present during the polymerization of the butyl rubber, or can be blended with the butyl or butyl rubber to form the star-branched butyl rubber.

More particularly, star-branched butyl rubber is typically a composition of the butyl and a copolymer of a polydiene and a partially hydrogenated polydiene selected from the group including styrene, polybutadiene, polyisoprene, polypiperylene, natural rubber, styrene-butadiene rubber, ethylene-propylene diene rubber, styrene-butadiene-styrene and styrene-isoprene-styrene block copolymers. These polydienes are present, based on the monomer wt %, greater than 0.3 wt % in one embodiment, and from 0.3 wt % to 3 wt % in another embodiment, and from 0.4 wt % to 2.7 wt % in yet another embodiment.

The elastomer or functionalized elastomer is present in the nanocomposite of the invention from 10 to 100 phr in one embodiment, from 20 to 80 phr in another embodiment, and from 30 to 70 phr in yet another embodiment, wherein a desirable range may be any combination of any upper phr limit with any lower phr limit.

Clay

Compositions of the invention include at least one functionalized elastomer blended by any suitable means with at least one clay, a swellable clay in one embodiment, which may or may not be exfoliated using an exfoliating agent. Swellable clay materials suitable for the purposes of this invention include natural or synthetic phyllosilicates, particularly smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydrotalcite and the like. These swellable clays generally comprise particles containing a plurality of silicate platelets having a thickness of 8-12 Å, and contain exchangeable cations such as $Na^+$, $Ca^{+2}$, $K^+$ or $Mg^{+2}$ present at the interlayer surfaces.

The swellable clay may be exfoliated by treatment with organic molecules (swelling or exfoliating "agents" or "additives") capable of undergoing ion exchange reactions with the cations present at the interlayer surfaces of the layered silicate. Suitable exfoliating agents include cationic surfactants such as ammonium, alkylamines or alkylammonium (primary, secondary, tertiary and quaternary), phosphonium or sulfonium derivatives of aliphatic, aromatic or arylaliphatic amines, phosphines and sulfides. Desirable amine compounds (or the corresponding ammonium ion) are those with the structure $R^2R^3R^4N$, wherein $R^2$, $R^3$, and $R^4$ are $C_1$ to $C_{30}$ alkyls or alkenes in one embodiment, $C_1$ to $C_{20}$ alkyls or alkenes in another embodiment, which may be the same or different. In one embodiment, the exfoliating agent is a so called long chain tertiary amine, wherein at least $R^2$ is a $C_{14}$ to $C_{20}$ alkyl or alkene.

Another class of exfoliating agents include those which can be covalently bonded to the interlayer surfaces. These include polysilanes of the structure —$Si(R^5)_2R^6$ where $R^5$ is the same or different at each occurrence and is selected from alkyl, alkoxy or oxysilane and $R^6$ is an organic radical compatible with the matrix polymer of the composite.

Other suitable exfoliating agents include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. Nos. 4,472,538, 4,810,734, 4,889,885 as well as WO92/02582.

In one embodiment, the exfoliating agents includes all primary, secondary and tertiary amines and phosphines; alkyl and aryl sulfides and thiols; and their polyfunctional versions. Desirable additives include: long-chain tertiary amines such as N,N-dimethyl-octadecylamine, N,N-dioctadecyl-methylamine, so called dihydrogenated tallowalkyl-methylamine and the like, and amine-terminated polytetrahydrofuran; long-chain thiol and thiosulfate compounds like hexamethylene sodium thiosulfate.

The exfoliating additive such as described herein is present in the composition in an amount to achieve optimal air retention as measured by the permeability testing described herein. For example, the additive may be present from 0.1 to 20 phr in one embodiment, and from 0.2 to 15 phr in another embodiment, and from 0.3 to 10 phr in yet another embodiment. The exfoliating agent, if present, may be added to the composition at any stage; for example, the additive may be added to the interpolymer, followed by addition of the clay, or may be added to the elastomer and clay mixture; or the additive may be first blended with the clay, followed by blending with the interpolymer in yet another embodiment.

In another embodiment of the invention, improved elastomer impermeability is achieved by the presence of at least one polyfunctional curative. An embodiment of such polyfunctional curatives can be described by the formula Z—$R^7$—Z', wherein $R^7$ is one of a $C_1$ to $C_{15}$ alkyl, $C_2$ to $C_{15}$ alkenyl, and $C_6$ to $C_{12}$ cyclic aromatic moiety, substituted or unsubstituted; and Z and Z' are the same or different and are one of a thiosulfate group, mercapto group, aldehyde group, carboxylic acid group, peroxide group, alkenyl group, or other similar group that is capable of crosslinking, either intermolecularly or intramolecularly, one or more strands of a polymer having reactive groups such as unsaturation. So-called bis-thiosulfate compounds are an example of a desirable class of polyfunctional compounds included in the above formula. Non-limiting examples of such polyfunctional curatives are as hexamethylene bis(sodium thiosulfate) and hexamethylene bis(cinnamaldehyde), and others are well known in the rubber compounding arts. These and other suitable agents are disclosed in, for example, the BLUE BOOK, MATERIALS, COMPOUNDING INGREDIENTS, MACHINERY AND SERVICES FOR RUBBER (Don. R. Smith, ed., Lippincott & Petto Inc. 2001). The polyfunctional curative, if present, may be present in the composition from 0.1 to 8 phr in one embodiment, and from 0.2 to 5 phr in yet another embodiment.

Treatment with the exfoliating agents described above results in intercalation or "exfoliation" of the layered platelets as a consequence of a reduction of the ionic forces holding the layers together and introduction of molecules between layers which serve to space the layers at distances of greater than 4 Å, preferably greater than 9 Å. This separation allows the layered silicate to more readily sorb polymerizable monomer material and polymeric material between the layers and facilitates further delamination of the layers when the intercalate is shear mixed with matrix polymer material to provide a uniform dispersion of the exfoliated layers within the polymer matrix.

The amount of clay or exfoliated clay incorporated in the nanocomposites in accordance with an embodiment of the invention is sufficient to develop an improvement in the mechanical properties and barrier properties of the nanocomposite, for example, tensile strength or oxygen permeability. Amounts generally will range from 0.1 wt % to 50 wt % in one embodiment, and from 0.5 wt % to 10 wt % in another embodiment, and from 0.5 wt % to 15 wt % in another embodiment, and from 1 wt % to 30 wt % in yet another embodiment, and from 1 wt % to 5 wt % in yet another embodiment, based on the polymer content of the nanocomposite. Expressed in parts per hundred rubber, the clay or exfoliated clay may be present from 1 to 30 phr in one embodiment, and from 5 to 20 phr in another embodiment. In one embodiment, the exfoliated clay is an alkylamine-exfoliated clay.

Secondary Rubber Component

A secondary rubber, or "general purpose rubber" component may be present in compositions and end use articles of the present invention. These rubbers may be blended by any suitable means with the elastomer or elastomer/clay composition. These rubbers include, but are not limited to, natural rubbers, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPM), ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl(polyisobutylene/isoprene copolymer) rubber; poly(isobutylene-co-p-methylstyrene) and halogenated poly(isobutylene-co-p-methylstyrene), such as, for example, terpolymers of isobutylene derived units, p-methylstyrene derived units, and p-bromomethylstyrene derived units, and mixtures thereof.

A desirable embodiment of the secondary rubber component present is natural rubber. Natural rubbers are described in detail by *Subramaniam* in RUBBER TECHNOLOGY 179-208 (Maurice Morton, ed., Chapman & Hall 1995). Desirable embodiments of the natural rubbers of the present invention are selected from Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646.

Polybutadiene (BR) rubber is another desirable secondary rubber useful in the composition of the invention. The Mooney viscosity of the polybutadiene rubber as measured at 100° C. (ML 1+4) may range from 35 to 70, from 40 to about 65 in another embodiment, and from 45 to 60 in yet another embodiment. Some commercial examples of these synthetic rubbers useful in the present invention are NATSYN™ (Goodyear Chemical Company), and BUDENE™ 1207 or BR 1207 (Goodyear Chemical Company). A desirable rubber is high cis-polybutadiene (cis-BR). By "cis-polybutadiene" or "high cis-polybutadiene", it is meant that 1,4-cis polybutadiene is used, wherein the amount of cis component is at least 95%. An example of high cis-polybutadiene commercial products used in the composition BUDENE™ 1207.

Rubbers of ethylene and propylene derived units such as EPM and EPDM are also suitable as secondary rubbers. Examples of suitable comonomers in making EPDM are ethylidene norbornene, 1,4-hexadiene, dicyclopentadiene, as well as others. These rubbers are described in RUBBER TECHNOLOGY 260-283 (1995). A suitable ethylene-propylene rubber is commercially available as VISTALON™ (ExxonMobil Chemical Company, Houston Tex.).

In another embodiment, the secondary rubber is a halogenated rubber as part of the terpolymer composition. The halogenated butyl rubber is brominated butyl rubber, and in another embodiment is chlorinated butyl rubber. General properties and processing of halogenated butyl rubbers is described in THE VANDERBILT RUBBER HANDBOOK 105-122 (Robert F. Ohm ed., R.T. Vanderbilt Co., Inc. 1990), and in RUBBER TECHNOLOGY 311-321 (1995). Butyl rubbers, halogenated butyl rubbers, and star-branched butyl rubbers are described by Edward Kresge and H. C. Wang in 8 KIRK-OTHMER ENCYCLOPEDIA OF CHEMICAL TECHNOLOGY 934-955 (John Wiley & Sons, Inc. 4th ed. 1993).

The secondary rubber component of the present invention includes, but is not limited to at least one or more of brominated butyl rubber, chlorinated butyl rubber, star-branched polyisobutylene rubber, star-branched brominated butyl (polyisobutylene/isoprene copolymer) rubber; halogenated poly(isobutylene-co-p-methylstyrene), such as, for example, terpolymers of isobutylene derived units, p-methylstyrene derived units, and p-bromomethylstyrene derived units (BrIBMS), and the like halomethylated aromatic interpolymers as in U.S. Pat. Nos. 5,162,445; 4,074,035; and 4,395,506; halogenated isoprene and halogenated isobutylene copolymers, polychloroprene, and the like, and mixtures of any of the above. Some embodiments of the halogenated rubber component are also described in U.S. Pat. Nos. 4,703,091 and 4,632,963.

In one embodiment of the invention, a so called semicrystalline copolymer ("SCC") is present as the secondary "rubber" component. Semi-crystalline copolymers are described in WO 00/69966. Generally, the SCC is a copolymer of ethylene or propylene derived units and α-olefin derived units, the α-olefin having from 4 to 16 carbon atoms in one embodiment, and in another embodiment the SCC is a copolymer of ethylene derived units and α-olefin derived units, the α-olefin having from 4 to 10 carbon atoms, wherein the SCC has some degree of crystallinity. In a further embodiment, the SCC is a copolymer of 1-butene derived units and another α-olefin derived unit, the other α-olefin having from 5 to 16 carbon atoms, wherein the SCC also has some degree of crystallinity. The SCC can also be a copolymer of ethylene and styrene.

The secondary rubber component of the elastomer composition may be present in a range from up to 90 phr in one embodiment, from up to 50 phr in another embodiment, from up to 40 phr in another embodiment, and from up to 30 phr in yet another embodiment. In yet another embodiment, the secondary rubber is present from at least 2 phr, and from at least 5 phr in another embodiment, and from at least 5 phr in yet another embodiment, and from at least 10 phr in yet another embodiment. A desirable embodiment may include any combination of any upper phr limit and any lower phr limit. For example, the secondary rubber, either individually or as a blend of rubbers such as, for example NR and BR, may be present from 5 phr to 90 phr in one embodiment, and from 10 to 80 phr in another embodiment, and from 30 to 70 phr in yet another embodiment, and from 40 to 60 phr in yet another embodiment, and from 5 to 50 phr in yet another embodiment, and from 5 to 40 phr in yet another embodiment, and from 20 to 60 phr in yet another embodiment, and from 20 to 50 phr in yet another embodiment, the chosen embodiment depending upon the desired end use application of the composition.

The elastomeric composition may have one or more filler components such as, for example, calcium carbonate, clay, silica, talc, titanium dioxide, and carbon black. In one embodiment, the filler is carbon black or modified carbon black, and combinations of any of these. In another embodiment, the filler is a blend of carbon black and silica. The preferred filler for such articles as tire treads and sidewalls is reinforcing grade carbon black present at a level of from 10 to 100 phr of the blend, more preferably from 30 to 80 phr in another embodiment, and from 50 to 80 phr in yet another embodiment. Useful grades of carbon black, as described in RUBBER TECHNOLOGY, 59-85, range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires, are N330, N351, N550, N650, N660, and N762.

The fillers of the present invention may be any size and typically range, for example, from about 0.0001 μm to about 100 μm. As used herein, silica is meant to refer to any type or particle size silica or another silicic acid derivative, or silicic acid, processed by solution, pyrogenic or the like methods and having a surface area, including untreated, precipitated silica, crystalline silica, colloidal silica, aluminum or calcium silicates, fumed silica, and the like.

One or more crosslinking agents are preferably used in the elastomeric compositions of the present invention, especially when silica is the primary filler, or is present in combination with another filler. More preferably, the coupling agent may be a bifunctional organosilane crosslinking agent. By an "organosilane crosslinking agent" is meant any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-amino-propyl triethoxysilane (sold commercially as A1100 by Witco), gamma-mercaptopropyltrimethoxysilane (A189 by Witco) and the like, and mixtures thereof. In one embodiment, bis-(3-triethoxysilypropyl)tetrasulfide (sold commercially as "Si69") is employed.

A processing aid may also be present in the composition of the invention. Processing aids include, but are not limited to, plasticizers, tackifiers, extenders, chemical conditioners, homogenizing agents and peptizers such as mercaptans, petroleum and vulcanized vegetable oils, mineral oils, paraffinic oils, naphthenic oils, aromatic oils, polybutene oils, waxes, resins, rosins, and the like. The aid is typically present from 1 to 70 phr in one embodiment, from 3 to 60 phr in another embodiment, and from 5 to 50 phr in yet another embodiment. Some commercial examples of processing aids are SUNDEX™ (Sun Chemicals), a naphthenic processing oil, PARAPOL™ (ExxonMobil Chemical Company), a polybutene processing oil having a number average molecular weight of from 800 to 3000, and FLEXON™ (ExxonMobil Chemical Company), a paraffinic petroleum oil.

The compositions produced in accordance with the present invention typically contain other components and additives customarily used in rubber mixes, such as effective amounts of other nondiscolored and nondiscoloring processing aids, pigments, accelerators, crosslinking and curing materials, antioxidants, antiozonants. General classes of accelerators include amines, guanidines, thioureas, thiazoles, thiurams, sulfenamides, sulfenimides, thiocarbamates, xanthates, and the like. Crosslinking and curing agents include sulfur, zinc oxide, and fatty acids. Peroxide cure systems may also be used. The components, and other curatives, are typically present from 0.1 to 10 phr in the composition.

Generally, polymer blends, for example, those used to produce tires, are crosslinked. It is known that the physical properties, performance characteristics, and durability of vulcanized rubber compounds are directly related to the number (crosslink density) and type of crosslinks formed during the vulcanization reaction. (See, e.g., Helt et al., *The Post Vulcanization Stabilization for NR* in RUBBER WORLD, 18-23 (1991). Generally, polymer blends may be crosslinked by adding curative molecules, for example sulfur, metal oxides, organometallic compounds, radical initiators, etc., followed by heating. In particular, the following metal oxides are common curatives that will function in the present invention: ZnO, CaO, MgO, $Al_2O_3$, $CrO_3$, FeO, $Fe_2O_3$, and NiO. These metal oxides can be used alone or in conjunction with the corresponding metal fatty acid complex (e.g., zinc stearate, calcium stearate, etc.), or with the organic and fatty acids added alone, such as stearic acid, and optionally other curatives such as sulfur or a sulfur compound, an alkylperoxide compound, diamines or derivatives thereof (e.g., DIAK products sold by DuPont). (See also, *Formulation Design and Curing Characteristics of NBR Mixes for Seals*, RUBBER WORLD 25-30 (1993). This method of curing elastomers may be accelerated and is often used for the vulcanization of elastomer blends.

The acceleration of the cure process is accomplished in the present invention by adding to the composition an amount of an accelerant, often an organic compound. The mechanism for accelerated vulcanization of natural rubber involves complex interactions between the curative, accelerator, activators and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), benzothiazyl disulfide (MBTS), hexamethylene-1,6-bisthiosulfate disodium salt dihydrate (sold commercially as DURALINK™ HTS by Flexsys), 2-(morpholinothio) benzothiazole (MBS or MOR), blends of 90% MOR and 10% MBTS (MOR 90), N-tertiary-butyl-2-benzothiazole sulfenamide (TBBS), and N-oxydiethylene thiocarbamyl-N-oxydiethylene sulfonamide (OTOS), zinc 2-ethyl hexanoate (ZEH), and "thioureas".

The Functionalizing Compound

Compounds suitable to effectuate the functionalization of the elastomers of the invention include unsaturated carboxylic acids, unsaturated esters, unsaturated anhydrides and unsaturated imides, derivatives of unsaturated carboxylic acids, unsaturated anhydrides and imides, and mixtures thereof. The functionalizing compound may be a mono or polycarboxylic acid, having from 3 to 22 carbon atoms in one embodiment. By way of example, the functionalizing compound may be selected from maleic acid, fumaric acid, citraconic acid, mesaconic acid, itaconic acid, himic acid, acetylenedicarboxylic acid and mixtures thereof. The functionalizing compound derivative may be a cyclic acid anhydride, an amide, an imide, an ester and mixtures thereof.

In one embodiment, the functionalizing compound is selected from the following:

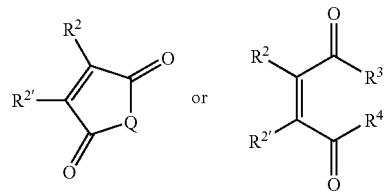

wherein Q is selected from —O— and an —$NR^1$— group, wherein $R^1$ is selected from hydrogen, $C_1$ to $C_{20}$ alkyls, alkenyls or aryls, substituted $C_1$ to $C_{20}$ alkyls, alkenyls or aryls; $R^2$ and $R^{2'}$ are the same or different and are selected from hydrogen, $C_1$ to $C_{20}$ alkyls, alkenyls or aryls, substituted $C_1$ to $C_{20}$ alkyls, alkenyls or aryls, hydroxyl and $C_1$ to $C_{20}$ alkoxys; and wherein $R^3$ and $R^4$ are the same or different and are selected from —$OR^5$ and —$NHR^5$, wherein $R^5$ is defined as $R^1$ above.

In another embodiment, $R_1$ is selected from hydrogen, $C_1$ to $C_{10}$ alkyls, alkenyls or aryls, substituted $C_1$ to $C_{10}$ alkyls, alkenyls or aryls.

In another embodiment, $R^2$ and $R^{2'}$ are the same or different and are selected from hydrogen, $C_1$ to $C_{10}$ alkyls, alkenyls or aryls, substituted $C_1$ to $C_{10}$ alkyls, alkenyls or aryls, hydroxyl and $C_1$ to $C_{10}$ alkoxys, such as, for example, —$OCH_3$, —$OCH_2CH_3$, —$OCH_2CH_2CH_3$, —$OCH_2(CH_3)CH_3$, etc.

Non-limiting examples of the functionalizing compound are maleimide, citraconic anhydride, itaconic anhydride, maleic anhydride, N,N'-phenylenedimaleimide, maleic acid, fumeric acid, and metal carboxylic salts thereof.

Suitable unsaturated esters include mono- and di-esters of diacids specified above, for example, monomethyl maleate, dimethyl maleate, diethyl maleate, diphenyl maleate, dibutyl fumarate.

Suitable unsaturated amides include mono- and di-amides of diacids specified above, for example, maleamic acid, and N-methylmaleamic acid.

Suitable unsaturated imides include imides of diacids specified above, for example, maleimide, N-methylmaleimide, N-phenylmaleimide.

Suitable unsaturated carboxylic acid derivatives are selected from the group consisting of maleic anhydride, a dialkyl maleate, itaconic anhydride, an alkylmaleamide, an N-alkylmaleimide, an alkylmaleate and mixtures thereof.

Suitable cyclic acid anhydrides include maleic anhydride, 2,3-dimethylmaleic anhydride, citraconic anhydride, itaconic anhydride, and himic anhydride.

The Functionalization Process

The functionalized or "grafted" $C_2$ to $C_7$ olefin elastomers for use in the nanocomposites of the present invention are prepared by contacting an elastomer as described above, with one or more functionalizing compounds in the presence of one or more free radical initiators at grafting reaction conditions in a reaction zone. The components are "contacted" under conditions that allow the components to react, thus resulting in the elastomer being functionalized with functional groups pendant to the elastomer backbone structure. The reaction can take place in the presence of the clay in one embodiment, and in the absence of the clay in another embodiment, followed by addition of the clay to the reaction product of the functionalizing compound and the elastomer.

Any part of the elastomer, any monomer unit or any moiety pendant to the elastomer may be functionalized as a result of the functionalization. In one embodiment, the styrenic or substituted styrenic derived unit of the elastomer, when present, is the functionalized monomer unit.

The elastomer, a copolymer of isobutylene and an alkylstyrene in one embodiment, and a copolymer of isobutylene and isoprene in another embodiment, or other the corresponding elastomer, is contacted with the functionalizing compound in the presence of a free radical initiator which may be a chemical compound or radiation. Suitable free radical initiators include (1) thermally decomposable compounds which generate radicals such as azo compounds or organic peroxides; (2) compounds which generate free radicals by non-thermal methods such as photochemical or redox processes; (3) compounds which have inherent radical character such as molecular oxygen; or (4) electromagnetic radiation such as X-rays, electron beams, visible light, ultraviolet-light.

Suitable organic peroxide compounds for use as free radical initiators include hydroperoxides, dialkyl peroxides, diacyl peroxides, peroxyesters, peroxydicarbonates, peroxyketals, ketone peroxides and organosulfonyl peroxides.

Preferably, the free radical initiator is an organic peroxide compound having a half-life, at the reaction temperature, of less than the reaction/residence time employed.

When the free radical initiator is a compound, suitable molar ratio of free radical initiator compound to functionalizing compound may range from 0.001:2 to 1:2 in one embodiment, and from 0.1:1 to 1:1 in another embodiment.

Desirably, the molar amount of functionalizing compound expressed in mmoles per gram, in the contacting zone may be 1.1 to 20 times the molar amount of these components as is desired in the final grafted copolymer. Thus, when the molar amount of functionalizing compound in the grafted copolymer is 0.05 mmoles per gram of product polymer, the amount of functionalizing compound introduced in the reaction zone is suitably from 1 to 0.055 mmoles per gram of the elastomer plus functionalizing compound present in the reaction mixture.

The grafting reaction may be conducted in the absence of a diluent or in a solution using a diluent. When a diluent is present in the reaction zone, suitable diluents include saturated aliphatic hydrocarbons, aromatic hydrocarbons, and perhalogenated hydrocarbons.

Preferably, the grafting reaction to produce the grafted polymer of the present invention in the melt phase is conducted in the absence of a diluent, wherein the elastomer is in the molten phase. The reaction temperature is chosen to be appropriate for the initiator used.

Suitable reaction conditions include a temperature ranging from 0° C. to 300° C. The suitable reaction temperature will vary according to the free radical initiator used. When an azo compound is used as the initiator, suitable temperatures will generally range from 25° C. to 150° C. When an organic peroxide is used as initiator, suitable temperatures range from 50° C. to 250° C. Higher temperatures may be used for other types of free radical initiators. When the reaction is conducted in the presence of a diluent, for example, solution processes, the reaction temperature will generally be below 200° C. For melt phase processes, (i.e., bulk phase processes), the reaction temperature may range from 25° C. such as in conventional electron beam irradiation equipment to 250° C. such as in polymer mixing equipment. The process for producing the grafted polymers of the present invention may be conducted as a batch process or as a continuous process.

The reaction is performed in a suitable reaction zone which may be a polymer mixing device such as a Banbury mixer, Brabender mixer, or a single or multiple screw extruder and the like for melt phase polymers or a glass flask, metal tank or tube when the process is conducted in the presence of a diluent.

When the molten elastomer itself is the reaction medium, uniform dispersion of the grafting agent and of the initiator is preferably performed by predispersion or by the incorporation of suitable mixing elements into the reactor (e.g., incorporation of mixing screw sections in an extruder). When electromagnetic radiation is used, dispersion of the initiator and functionalizing compound will include uniform exposure of all parts of the copolymer or copolymer solution to the beam.

In one embodiment, the grafting process to produce the grafted polymer of the invention is carried out in a twin screw extruder having, in sequence, screw elements, which will (i) heat the polymer by shear and compression to or close to the desired reaction temperature, (ii) mix the copolymer at or close to reaction temperature with the grafting agent, (iii) mix the copolymer containing the grafting agent with the initiator, (iv) allow appropriate residence time for the grafting reaction, (v) allow venting or washing away of unreacted grafting agent and initiator coproducts, (vi) mix with clay, with proper residence time and dispersion time, desirably mixing at a temperature less than 250° C., (vii) allow mixing of any desired stabilizers or additives and (vii) forward the reacted, vented stabilized polymer to an appropriate finishing device (e.g. drumming device, baler, pelletizer, etc.). In another embodiment, steps (vi) and (vii) may merge into one step by adding clay, desirably exfoliated clay, and the desired stabilizers or additives (e.g., processing oils, fillers, curatives, accellerants, etc.) at the same time.

The functionalized monomer unit (or alternately, the number of functional groups) may be present in the elastomer of the present invention in an amount ranging from 1.5 to 0.001 millimole (mmole) per gram of functionalized (or "grafted") elastomer in one embodiment, and from 1.0 to 0.002 mmole per gram in another embodiment, and from 0.8 to 0.01 mmole per gram of the grafted elastomer product in yet another embodiment. Described another way, the functionalized unit is present on the elastomer from 0.01 wt % to 15 wt % by weight of the elastomer in one embodiment, and from 0.05 wt % to 10 wt % by weight of the elastomer in another embodiment.

Thus, an aspect of the present invention can be described as a nanocomposite comprising clay and an elastomer comprising $C_2$ to $C_7$ olefin derived units; wherein the elastomer comprises functionalized monomer units comprising functional groups pendant to the elastomer, E, the groups selected from:

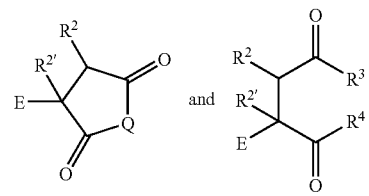

wherein Q is selected from O and an $NR^1$ group, wherein $R^1$ is selected from hydrogen, $C_1$ to $C_{20}$ alkyls, alkenyls or aryls, substituted $C_1$ to $C_{20}$ alkyls, alkenyls or aryls; $R^2$ and $R^{2'}$ are the same or different and are selected from hydrogen, $C_1$ to $C_{20}$ alkyls, alkenyls or aryls, substituted $C_1$ to $C_{20}$ alkyls, alkenyls or aryls, hydroxyl and $C_1$ to $C_{20}$ alkoxys; and wherein $R^3$ and $R^4$ are the same or different and selected from —$OR^5$ and —$NHR^5$, wherein $R^5$ is defined as $R^1$ above.

Alternately, the present invention can be described as a nanocomposite comprising clay and the reaction product of contacting an elastomer comprising $C_2$ to $C_7$ olefin derived units with a free radical initiator (e.g., peroxides, azo compounds, etc.) and at least one functionalizing compound selected from unsaturated acid anhydrides, unsaturated esters, unsaturated imides, and mixtures thereof. The product of contacting the elastomer and the functionalizing compound and Lewis acid may be described as an elastomer having one or more functional groups as described in either one or both of structures (I) and (II) above.

In one embodiment, the elastomer also comprises p-methylstyrene derived units. In another embodiment, the $C_2$ to $C_7$ olefin derived unit is isobutylene. In yet another embodiment, the elastomer is poly(isobutylene-co-p-methylstyrene). When present, the p-methylstyrene derived units are present from 4 to 15 wt % of the elastomer.

In yet another embodiment, the elastomer comprises monomer units selected from ethylene, $C_3$ to $C_7$ α-olefin derived units and p-methylstyrene derived units.

And in yet another embodiment, the elastomer comprises $C_4$ to $C_7$ isoolefin derived units and multiolefin derived units.

In yet another embodiment, the elastomer is selected from natural rubber, poly(isobutylene-co-isoprene), polybutadiene, poly(styrene-co-butadiene) rubber, poly(isoprene-co-butadiene), poly(styrene-isoprene-butadiene), star-branched polyisobutylene rubber, poly(isobutylene-co-p-methylstyrene), ethylene-propylene-alkylstyrene rubber and mixtures thereof; and from poly(isobutylene-co-isoprene), polybutadiene, poly(styrene-co-butadiene) rubber, poly(isoprene-co-butadiene), poly(styrene-isoprene-butadiene), star-branched polyisobutylene rubber, poly(isobutylene-co-p-methylstyrene), ethylene-propylene-alkylstyrene rubber and mixtures thereof in another embodiment.

The functionalized units are present on the elastomer from 0.01 wt % to 15 wt % of the elastomer in one embodiment of the elastomer, and in other ranges as described herein.

In one embodiment, the clay is swellable, and exfoliated in another embodiment, wherein the clay has been treated with an exfoliating agent to form an exfoliated clay. In the embodiment where the clay is exfoliated, the exfoliating agent is selected from ammonium ion, alkylamines, alkylammonium ion (primary, secondary, tertiary and quaternary), phosphonium or sulfonium derivatives of aliphatic, aromatic or arylaliphatic amines, phosphines and sulfides and blends thereof.

The clay is present from 0.1 wt % to 50 wt % of the nanocomposite in one embodiment; and present from 0.5 wt % to 15 wt % of the nanocomposite in another embodiment; and present from 1 wt % to 30 wt % of the nanocomposite in yet another embodiment.

The nanocomposite may also comprise other components such as a filler selected from carbon black, modified carbon black, silica, precipitated silica, and blends thereof.

Further, the nanocomposite may also comprise one or more curing agents, wherein the curing agent is selected from zinc, zinc stearate, fatty acids, sulfur, diamine, diepoxy, polyamine, polyepoxy and mixtures thereof.

Further, the nanocomposite may also comprise a secondary rubber or "general purpose rubber", the secondary rubber selected from natural rubber, polybutadiene rubber, nitrile rubber, silicon rubber, polyisoprene rubber, poly(styrene-co-butadiene) rubber, poly(isoprene-co-butadiene) rubber, styrene-isoprene-butadiene rubber, ethylene-propylene rubber, brominated butyl rubber, chlorinated butyl rubber, halogenated isoprene, halogenated isobutylene copolymers, polychloroprene, star-branched polyisobutylene rubber, star-branched brominated butyl rubber, poly(isobutylene-co-isoprene) rubber; halogenated poly(isobutylene-co-p-methylstyrene), ethylene-propylene rubber and mixtures thereof.

In one aspect of the invention, the nanocomposite is formed using any suitable method known in the art into an air barrier such as an innerliner or innertube suitable for vehicle tires, truck tires, automotive and motorcycle tires, and other tires.

The invention also includes a method of forming a nanocomposite comprising contacting: (a) an elastomer, wherein the elastomer comprises $C_2$ to $C_7$ olefin derived units; (b) at least one functionalizing compound selected from unsaturated acid anhydrides, unsaturated esters, unsaturated imides, and mixtures thereof; (c) at least one free radical initiator; and (d) clay.

In one embodiment, the elastomer is first contacted with the functionalizing compound, followed by contacting with the clay.

In another embodiment, the elastomer, clay and functionalizing compound are contacted simultaneously.

The free radical initiator may be such compounds as azo compounds, peroxides, etc., or any suitable compound or blend of compounds suitable as a free radical initiator. Suitable peroxides may be selected from diacyl peroxides, ketone peroxides, peroxyesters, peroxydicarbonates, dialkyl peroxides, hydroperoxides, peroxyketals.

In yet another embodiment of the method, the elastomer and functionalizing compound are melt blended, and the elastomer and functionalizing compound are solubilized in a diluent in yet another embodiment.

In one embodiment, the functionalizing compound is selected from:

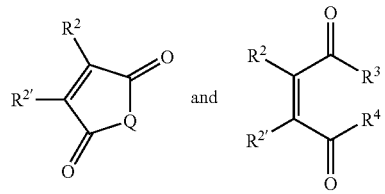

wherein Q is selected from O and an $NR^1$ group, wherein $R^1$ is selected from hydrogen, $C_1$ to $C_{20}$ alkyls, alkenyls or aryls, substituted $C_1$ to $C_{20}$ alkyls, alkenyls or aryls; $R^2$ and $R^{2'}$ are the same or different and are selected from hydrogen, $C_1$ to $C_{20}$ alkyls, alkenyls or aryls, substituted $C_1$ to $C_{20}$ alkyls, alkenyls or aryls, hydroxyl and $C_1$ to $C_{20}$ alkoxys; and wherein $R^3$ and $R^4$ are the same or different and are selected from —$OR^5$ and —$NHR^5$, wherein $R^5$ is defined as $R^1$ above.

In another embodiment, the functionalizing compound is selected from monomethyl maleate, dimethyl maleate, diethyl maleate, diphenyl maleate, dibutyl fumarate, maleimide, citraconic anhydride, itaconic anhydride, maleic anhydride, N,N'-phenylenedimaleimide, N-methylmaleimide, N-phenylmaleimide, maleic acid, itaconic acid, and the metal carboxylic derivatives thereof.

The following examples illustrate the invention:
Test Methods

Permeability Testing. All specimens were compression molded with slow cooling to provide defect free pads. Typical thickness of a compression molded pad is about 15 mil. using an Arbor press, 2" diameter disks were then punched out from molded pads for permeability testing. These disks were conditioned in a vacuum oven at 60° C. overnight prior to the measurement. The oxygen permeation measurements were done using a Mocon OX-TRAN 2/61 permeability tester at 40° C. under the principle of R. A. Pasternak et. al. in 8 JOURNAL OF POLYMER SCIENCE: PART A-2 467 (1970). Disks thus prepared were mounted on a template and sealed with a vacuum grease. 10 psi nitrogen was kept on one side of the disk, whereas the other side is 10 psi oxygen. Using the oxygen sensor on the nitrogen side, increase in oxygen concentration on the nitrogen side with time could be monitored. The time required for oxygen to permeate through the disk, or for oxygen concentration on the nitrogen side to reach a constant value, is recorded and used to determine the oxygen permeability.

EXAMPLES

The present invention, while not meant to be limiting by, may be better understood by reference to the following examples and Tables.

As a comparative example (comparative Example 1), the permeability of poly(isobutylene-co-p-methylstyrene) ("XP 50") containing 11.5 wt % p-methylstyrene derived units (40.5 g) was measured. The results of oxygen permeability measurements are shown in Table 2.

In Example 2, XP 50 containing 11.5 wt % p-methylstyrene (42 g) was blended with maleic anhydride (3 g), LUPEROX 11M75 (1 mL) and Cloisite 6A in a Brabender at 160° C. at 60 rpm for 20 minutes while LUPEROX was added slowly over a period of 5 minutes. The permeability data is summarized for each example in Table 2.

In Example 3, the following procedure was carried out: XP 50 comprising 11.5 wt % p-methylstyrene (42 g) was blended with maleic anhydride (3 g) and LUPEROX 11M75 (1 mL) in a Brabender at 190° C. at 60 rpm for 20 minutes. Next, Cloisite 6A (4.5 g) was added and the melt was mixed for 15 additional minutes. The permeability data is summarized in Table 2.

In Example 4, the following procedure was carried out: XP 50 containing 11.5 wt % p-methylstyrene (42 g) was blended with maleic anhydride (3 g) and LUPEROX 11M75 (1 mL) in a Brabender at 160° C. at 60 rpm for 20 minutes. Then Cloisite 6A (4.5 grams) was added and the melt was mixed for 15 more minutes. The permeability data is summarized for each example in Table 2.

For examples 5-16, the following procedure was carried out: 45 g of XP 50, 11.5 wt % p-methylstyrene, was melt blended in a Brabender for one minute at a rotor speed of 60 rpm. A mixture of peroxide (as indicated in Table 2) and maleic anhydride (in 3 mL acetone) was slowed mixed for 5 minutes at 40° C. This mixture was then added to the XP 50 in the Brabender and mixed for 5 minutes with a rotor speed of 60 rpm at 200° C. From this, 40.5 g of the XP 50 reaction product was then melt blended in a Brabender for 1 minute at a rotor speed of 60 rpm and 160° C. To this melt was added 4.5 g of Cloisite 6A. After the clay addition, the mixture was blended for 10 minutes at 60 rpm and 160° C. The results of oxygen permeability are shown in Table 2.

Example 17 illustrates the sequential process i) functionalization, venting of excess functionalizing compound iii) clay addition and mixing to prepare nanocomposite. For example 17, the following procedure was carried out: Butyl rubber (45 g, XP 50, 11.5% PMS) was melt in Brabender for one minutes with a rotor speed of 60 rpm at 180° C. Next, a solution of maleic anhydride (1.5 grams) and LUPEROX P (1 mL) in 1.5 mL acetone was added. After 8 minutes, the temperature was increased to 210° C. with mixing for 3 minutes. Then cooling down to 160° C., 3 grams of modified polymer was taken out. To the remaining modified butyl rubber was added Cloisite 6A (4.5 g). After the addition of clay, the mixture was mixed for 10 more minutes at 60 rpm and 160° C. The results of oxygen permeability are shown in Table 2.

Example 18 illustrates the sequential addition of functionalizing agent and peroxide. For example 18, the following procedure was carried out: Butyl rubber (45 g, XP 50, 11.5% PMS) was melt blended in Brabender for one minute with a rotor speed of 60 rpm at 180° C. Then a solution of maleic anhydride (1.5 grams) and LUPEROX P (1 mL) in 3 mL acetone was added. After 8 minutes, more maleic anhydride (1.5 grams) and LUPEROX P (1 mL) in 3 mL acetone was added. After 8 minutes, the temperature was increased to 210° C. and mixing continued for 3 minutes. The mixture was then cooled down to 160° C.; 3 grams of modified polymer was removed. To the remaining modified butyl rubber, Cloisite 6A (4.5 g) was slowly added. After the addition, the mixture was mixed for 10 more minutes at 60 rpm and 160° C. The results of oxygen permeability are shown in Table 2.

Example 19 illustrates the use of functionalized butyl for blend application. For example 19, the following procedure was carried out: Butyl rubber (XP50, 31.5 grams) and maleic anhydride-modified XP50 (9.0 grams, succinic anhydride weight % in final polymer=0.9) were melt blended in a Brabender for three minutes with a rotor speed of 60 rpm at 160° C. To this melt was added Cloisite 6A (4.5 grams). The mixture was further mixed for 10 minutes. The results of oxygen permeability are shown in Table 2.

Example 20 illustrates the use of maleimide as functionalizing compound. For example 20, the following procedure was carried out: Butyl rubber (45 g, XP 50, 11.5% PMS) was melt blended in Brabender for one minute with a rotor speed of 60 rpm. A mixture of LUPEROX 11M75 (1.86 mL) and maleimide (2.97 grams) were slowly added and mixed for 5 minutes at 40° C. The blend was mixed in for 5 minutes with a rotor speed of 60 rpm at 200° C. Modified butyl rubber (40.5 g) was melt blended in Brabender for one minute with a rotor speed of 60 rpm and 160° C. Then, Cloisite 6A (4.5 g) was slowly added, and after the addition the mixture was mixed for 10 more minutes at 60 rpm and 160° C. The results of oxygen permeability are shown in Table 2.

Example 21 illustrates the use of maleic acid as functionalizing compound. For example 21, the following procedure was carried out: Butyl rubber (45 g, XP 50, 11.5% PMS) was melt in Brabender for one minutes with a rotor speed of 60 rpm. A mixture of LUPEROX 11M75 (1.86 mL) and maleic acid (3.60 grams) were slowly added and the melt was mixed for 5 minutes at 40° C. Then, the blend was mixed in for 5 minutes with a rotor speed of 60 rpm at 200° C. Modified butyl rubber (40.5 g) was melt blended in Brabender for one minute with a rotor speed of 60 rpm and 160° C. Then, Cloisite 6A (4.5 g) was slowly added, followed by additional mixing for 10 more minutes at 60 rpm and 160° C. The results of oxygen permeability are shown in Table 2.

Nanocomposites of the present invention have a permeation rate of less than 130 mm·cc/(m$^2$·day) at 40° C. in one embodiment, and less than 120 mm·cc/(m$^2$·day) at 40° C. in another embodiment, and less than 110 mm·cc/(m$^2$·day) at 40° C. in yet another embodiment, and between 130 and 60 mm·cc/(m$^2$·day) at 40° C. in yet another embodiment.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the scope of the present invention. Further, certain features of the present invention are described in terms of a set of numerical upper limits and a set of numerical lower limits. It should be appreciated that ranges formed by any combination of these limits are within the scope of the invention unless otherwise indicated.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

TABLE 1

Material Description

| Component | Description | Material Source |
|---|---|---|
| dicumylperoxide | "peroxide" | Aldrich Chemical Company |
| LUPEROX 11M75 | 75% w/w tert-butyl peroxopivalate | Atofina Canada Inc. |
| LUPEROX P | 98% t-butylperoxybenzoate | Atofina Canada Inc. |
| maleimide | "functionalizing compound" | Aldrich Chemical Company |
| Maleic acid | "functionalizing compound" | Aldrich Chemical Company |
| maleic anhydride | "functionalizing compound" | Aldrich Chemical Company |
| 6A | Montmorillonite clay treated with di-methyl di-hydrogenated tallow alkyl ammonia chloride | Cloisite 6A, Southern Clay |

TABLE 2

Permeability data[1]

| Example | peroxide (amount, mL or grams) | peroxide (wt % relative to elastomer) | permeation rate mm · cc/(m$^2$ · day) at 40° C. |
|---|---|---|---|
| 1 (comp.) | — | — | 147.3 |
| 2 | LUPEROX 11M75 (1 mL) | 2.02 | 107.5 |
| 3 | LUPEROX 11M75 (1 mL) | 2.02 | 93.4 |
| 4 | LUPEROX 11M75 (1 mL) | 2.02 | 96.1 |
| 5 | dicumylperoxide (1.78 g) | 3.96 | 117.7 |
| 6 | dicumylperoxide (0.90 g) | 2.00 | 112.5 |
| 7 | dicumylperoxide (2.67 g) | 5.93 | 117.2 |
| 8 | dicumylperoxide (3.55 g) | 7.89 | 104.8 |
| 9 | LUPEROX P (1.25 mL) | 2.84 | 101.2 |
| 10 | LUPEROX P (0.63 mL) | 1.43 | 99.6 |
| 11 | LUPEROX P (1.88 mL) | 4.27 | 96.0 |
| 12 | LUPEROX P (2.50 mL) | 5.67 | 112.5 |
| 13 | LUPEROX 11M75 (1.86 mL) | 3.51 | 101.6 |
| 14 | LUPEROX 11M75 (0.93 mL) | 1.76 | 97.9 |
| 15 | LUPEROX 11M75 (2.79 mL) | 5.27 | 105.0 |
| 16 | LUPEROX 11M75 (3.72 mL) | 7.03 | 106.7 |
| 17 | LUPEROX P (1 mL) | 2.27 | 79.22 |
| 18 | LUPEROX P (2 mL) | 4.54 | 98.4 |
| 19 | — | — | 104.7 |
| 20 | LUPEROX 11M75 (1.86 mL) | 3.51 | 88.5 |
| 21 | LUPEROX 11M75 (1.86 mL) | 3.51 | 102.6 |

[1]All samples were dried under vacuum prior to permeation measurement.

We claim:

1. A curable elastomeric nanocomposite consisting of a swellable clay and a nonhalogenated elastomer having a viscosity average molecular weight in the range of 200,000 to 2,000,000, the nonhalogenated elastomer comprising $C_2$ to $C_{10}$ olefin derived units and styrenic derived units and/or substituted styrenic derived units, wherein all the styrenic derived units are present from 1 to 15 wt % of the elastomer; wherein the elastomer also comprises functionalized monomer units having functional groups pendant to the elastomer, E, selected from the following:

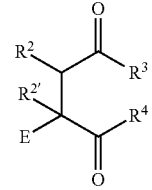

wherein $R^2$ and $R^{2'}$ are the same or different and are selected from the group consisting of hydrogen, $C_1$ to $C_{20}$ alkyls, alkenyls or aryls, substituted $C_1$ to $C_{20}$ alkyls, alkenyls or aryls, hydroxyl and $C_1$ to $C_{20}$ alkoxys; and wherein $R^3$ and $R^4$ are the same or different and is —$OR^5$ or —$NHR^5$, wherein $R^5$ is selected from the group consisting of hydrogen, $C_1$ to $C_{20}$ alkyls, alkenyls or aryls, and substituted $C_1$ to $C_{20}$ alkyls, alkenyls or aryls.

2. The nanocomposite of claim 1, wherein the olefin is selected from one or more of isobutylene, isobutene, 2-methyl-1-butene, 3-methyl-1-butene, 2-methyl-2-butene, and 4-methyl-1-pentene, ethylene, propene, 1-butene, 1-hexene, and 1-octene.

3. The nanocomposite of claim 1, wherein the elastomer also comprises isoolefin derived units and p-methylstyrene derived units.

4. The nanocomposite of claim 1, wherein the functionalized units are present on the elastomer from 0.01 wt % to 15 wt % of the elastomer.

5. The nanocomposite of claim 1, wherein the clay has been treated with an exfoliating agent to form an exfoliated clay.

6. The nanocomposite of claim 1, wherein the clay is present from 0.1 wt % to 50 wt % of the nanocomposite.

7. An article comprising the nanocomposite of claim 1, the article being a tire innerliner or an innertube.

8. The nanocomposite of claim 1, wherein the clay is present from 0.2 wt % to 10 wt % of the nanocomposite.

9. The nanocomposite of claim 1, wherein the clay is present from 1 wt % to 30 wt % of the nanocomposite.

10. The nanocomposite of claim 5, wherein the exfoliating agent is selected from ammonium ion, alkylamines, alkylammonium ion (primary, secondary, tertiary and quaternary), phosphonium or sulfonium derivatives of aliphatic, aromatic or arylaliphatic amines, phosphines and sulfides and blends thereof.

* * * * *

UNITED STATES PATENT AND TRADEMARK OFFICE
CERTIFICATE OF CORRECTION

PATENT NO. : 8,399,551 B2  Page 1 of 1
APPLICATION NO. : 10/518193
DATED : March 19, 2013
INVENTOR(S) : Gong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1413 days.

Signed and Sealed this
First Day of September, 2015

Michelle K. Lee
*Director of the United States Patent and Trademark Office*